Aug. 26, 1952 — J. MASSIOT — 2,608,662
ARRANGEMENT FOR CHECKING THE TEMPERATURE
OF THE ANODE OF X-RAY TUBES
Filed Aug. 14, 1950
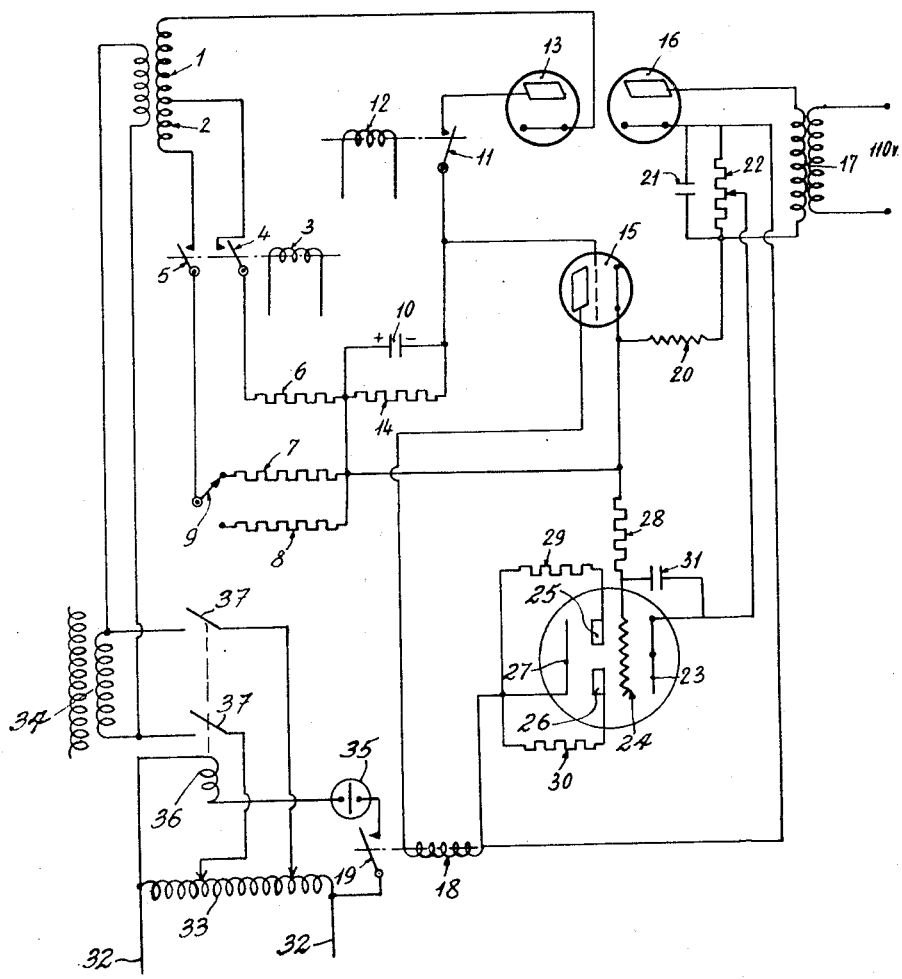
INVENTOR
JEAN MASSIOT
BY Linton and Linton
ATTORNEYS Patented Aug. 26, 1952

2,608,662

UNITED STATES PATENT OFFICE 2,608,662

ARRANGEMENT FOR CHECKING THE TEMPERATURE OF THE ANODE OF X-RAY TUBES

Jean Massiot, Courbevoie, France

Application August 14, 1950, Serial No. 179,240
In France September 9, 1949

5 Claims. (Cl. 250—95)

1

The object of my invention is a method and arrangement enabling an estimate to be made at any moment of the temperature of the anode of a generating tube for X-rays and a stoppage to be effected of the working of the plant in the event of going beyond the temperature permitted.

There is a proportionate increase in the thermal charge with the power set up and with the time factor and a decrease according to the heat radiation of the anode. My invention is based on the observed data that the changes (in the thermal charge are similar to the changes) in the electric charge of a capacity; just as from the thermal charge and from the mass of the anode its temperature may be inferred, so the voltage of a condenser may be inferred from its electric charge and its capacity. My invention lies in making use of this similarity for estimating the temperature of the anode in accordance with the voltage of a capacity that is itself fed from a voltage that is proportional to the feed voltage of the X-ray tube and that is linked up with a discharge circuit adjusted so that the discharge time is equal to the cooling period of the anode.

For the automatic control of stoppage of plant when the allowed peak is reached in the capacity voltage, use may be made of this voltage for giving polarity to the grid of a three-electrode valve that is used for feeding a relay controlling a closing contact, so that the charge of the condenser causes the opening of the relay and its contact while shutting off the working of the plant.

Use again may be made of the output variation of the plate circuit of the valve as above for estimating the margin of charge still available; a milliamperemeter for instance may be employed for measuring this plate circuit current, but use may be made of it also, if absolute accuracy is not essential, to actuate a cathode indicator, with preferably dual sensitivity so that this indicator distinctly records, between the lack of charge and the peak charge of the capacity, an intermediate charge that shows that already there is a marked decrease in the available margin of thermal charge that may be brought to the anode.

A more detailed description will be given of an example of carrying out my invention taken with reference to the attached drawing that shows a diagram of a checking equipment provided with automatic control for stoppage of working of the X-ray tube, when the anode of the latter reaches its peak thermal charge, and that includes further a cathode ray tube of dual sensitivity to enable a better estimate to be made at any moment of the still available margin of thermal charge.

2

The secondary of a transformer giving the real voltage at the terminals of the tube includes two windings 1 and 2, of which the first supplies the voltage for radioscopy while the two together supply voltage for radiography. The contact-maker 3, that settles the radioscopy or radiography, actuates two movable contacts 4—5, the first for opening and the second for closing, in order to apply either the voltage of the winding 1 to the resistance 6 through the closing of the contact 4, when the contact-maker 3 is not excited, or the voltage of the windings 1—2 to one of the resistances 7—8 through the closing of contact 5, when the contact-maker 3 is excited; the charging of one of the resistances 7—8 is ensured by means of the switch 9 that fixes the different rates for radiography (to the number of two in the example shown). The opposite ends of the resistances 6—7—8 are connected to the positive armature of a strong capacity 10, of which the negative armature is connected, by means of the movable contact 11 of a relay 12, to the plate of a rectifying valve 13 through which the secondary of the transformer charges the capacity 10; a discharge resistance 14 is connected in parallel on this capacity. The relay 12 is closed in step with the appearance of the voltage on the primary of the high-voltage generating transformer and is used to fix the charging time of the capacity 10.

The negative armature of the capacity 10 is connected to the grid of a three-electrode valve 15 fed, through means of a rectifying valve 16, by the secondary of a transformer 17, of which the primary takes as steady a voltage current as possible, for instance of 110 volts; the plate circuit of this valve 15 includes the winding of a relay 18 that actuates a closing contact 19 thus enabling the plant to work.

The valve 15 delivers through a resistance 20 and there are connected in parallel on the 18—15—20 assembly, a condenser 21 and a resistance 22 at one point of which is connected the dual cathode 23 of a cathode ray tube of dual sensitivity, of which the grid has been shown at 24, the two plates 25—26 and the indicator screen at 27. The grid is polarised by its linkup with the cathode of the valve 15 through the resistance 28 and the plates 25—26 are fed by the cathode of the valve 16 by means of the respective resistances 29—30. A capacity 31 is plugged in between the cathode 23 and the grid 24.

Reference character 32 indicates the low voltage supply line (for example 220 volts), 33 an auto-transformer for primary adjusting, 34 the high-tension transformer the high voltage secondary winding of which supplies the X-ray tube 35 a hand-operated switch, 36 a relay for closing the contacts 37 supplying the transformer 34 with said relay being supplied by the line 32 through the switch 35 in series with the contact 19. The opening of contact 19 operates thus the opening of contacts 37 and stops the working of the X-ray plant.

The working of the arrangement as described above is carried out as shown in what follows. It will be pointed out to begin with how the resistance 14 and the resistances 6—7—8 may be fixed. If for instance the voltage of the capacity 10 corresponding to the peak temperature of the anode is selected at 20 volts and if the diagrams of the makers of generating X-ray tubes point out that it takes 6 minutes for the anode to radiate entirely its heat outwards, the resistance 14 will be fixed so that the voltage of the capacity is lowered from 20 volts to zero in a period of 6 minutes. To fix the resistances 6—7—8, they will be set up according to the time required to reach the thermal charge of the anode with the current strength of the rate corresponding to each resistance: if for instance with an adjustment of radiography to 100 kilovolts and 400 milliamps, the total thermal charge of the anode is reached in 50", the corresponding resistance, for instance the resistance 8, will be set up so that at a voltage of 100 kv. in the tube applied during 50", there is a corresponding voltage of 20 v. on the capacity 10 and the operation is carried on in the same way for resistances 6—7.

When the capacity is uncharged (cold anode), the plate circuit of the valve 15 is traversed by a current able to close the relay 18, which enables the X-ray set to work. When the capacity 10 is charged, the grid of the valve 15 becomes more and more negative while there is a progressive lessening in the valve output up to the opening of the relay 18, corresponding to the peak temperature of the anode, which stops the set working. The capacity 10 is then discharged through the resistance 14, thus increasing the output of the valve 15 and when a certain proportion of the peak charge is reached, the relay 18 is again closed while enabling the set to work once more: the opening and closing points of the relay 18 may be regulated by stiffening up its opposing spring.

An estimate may be made at each moment of the charge of which use may be allowed in accordance with the current of the plate circuit of the valve 15, since this current decreases when the charge increases, that is to say when the margin of charge available becomes less. An accurate measurement of this current might be made by means of a milliamperemeter that might be calibrated as temperatures of the anode or as thermal charges already absorbed and as thermal charges remaining to be absorbed. In the example shown in the drawing, the charge available is judged with the help of the cathode ray tube with dual sensitivity that has been disclosed and the voltage of the cathode of this ray tube is regulated by the resistance 22, so that the indicator is closed entirely at the moment when the relay opens, while the resistance 20 is fixed so that the indicator is wide open when the capacity 10 is uncharged; lastly the resistances 29—30 are fixed in order that the first sector of the indicator is closed when a certain proportion of the peak charge is reached, so that this closing of the first sector indicates that the charge available is already greatly cut. In proportion as the capacity 10 is charged, with the decrease of the output of the plate circuit of the valve 15, the voltage difference between the terminals of the resistance 20 is less and the voltage of the grid 24 is lowered with the liability to drop below that of the point of the resistance 22 connected to the cathode 23, which controls the progressive closing of the cathode ray tube.

In a multi-direction set, each X-ray tube will be shown by a 10—14 group and a play of switches will enable the charging and recording system to be located on the direction and current strength being worked.

This arrangement, even if it does not follow absolutely the temperature of the anode of the tube, enables however its thermal charge to be formerly restricted, thus granting a new lease of life to the X-ray tube, specially in stations with an excessive amount of work.

I declare that what I claim is:

1. A device for representing at each moment the anode temperature of an X-ray tube for medical diagnostic service, comprising a transformer adapted to produce a low voltage proportional to the energizing voltage of the anode of said tube, a capacitor the electric charge of which is adapted for representing the thermal load of said anode, a charging circuit for said capacitor supplied by the secondary winding of said transformer, a rectifier tube in series in said charging circuit, an electric switch connected in series in said charging circuit and adapted to be operated by a relay supplied in synchronism with the primary of the high voltage transformer supplying the X-ray tube, a set of different resistances, means for inserting in series into said charging circuit the one resistance which corresponds to the adjustment chosen for the operation of the X-ray tube, a leakage resistance across said capacitor for discharging it at a rate corresponding to the cooling speed of said tube anode, and indicating means operated in response of the charge of said capacitor.

2. A device as claimed in claim 1, comprising a three-electrode valve having a grid connected to said capacitor, a cathode and an anode, means for supplying a direct voltage between said anode and cathode of said valve, a switch for controlling the operation of the X-ray and means for operating said switch in response to the current circulating between said anode and said cathode of said valve.

3. A device as claimed in claim 1, comprising a three-electrode valve having a grid connected to said capacitor, a cathode and an anode, means for supplying a direct voltage between said anode and cathode of said valve, a switch for controlling the operation of the X-ray tube, means for operating said switch in response to the current circulating between said anode and said cathode of said valve, and means for indicating the current intensity between said anode and said cathode of said valve, in order to give information about the thermal load of said X-ray tube at each moment.

4. A device as claimed in claim 1, comprising a three-electrode valve having a grid connected to said capacitor, a cathode and an anode, means for supplying a direct voltage between said anode and said cathode of said valve, a switch for controlling the operation of the X-ray tube, means for operating said switch in response to the current circulating between said anode and said cathode of said valve, a resistance in series in the anode-cathode circuit of said valve, a cathode ray tube having a grid connected to an end of said resistance, a cathode connected to the other end of said resistance and an anode connected to a supply of direct constant voltage, and means for adjusting said cathode ray tube in such a way that said cathode ray tube is closed for a determined charge of said capacitor and is opened when the capacitor is without charge.

5. A device as claimed in claim 1, comprising a three-electrode valve having a grid connected to said capacitor, a cathode and an anode, means for supplying a direct voltage between said anode and said cathode of said valve, a switch for controlling the operation of the X-ray tube, means for operating said switch in response to the current circulating between said anode and said cathode of said valve, a resistance in series in the anode-cathode circuit of said valve, a double cathode ray tube having a common grid connected to an end of said resistance, a double cathode connected to the other end of said resistance and two separate anodes each connected through a different adjusting resistance to a supply of direct constant voltage, and means for adjusting said cathode ray tube in such a manner that it is opened when no charge is on said capacitor and that a first sector of said cathode ray tube is closed when the capacitor has received a determined fraction of the charge corresponding to the maximum thermal load of the X-ray tube anode, whereas the second sector is closed when the capacitor has received a greater fraction, near the unity, of the same load.

JEAN MASSIOT.

REFERENCES CITED

The following references are of record in the file of this patent:

UNITED STATES PATENTS

| Number | Name | Date |
|---|---|---|
| 2,175,700 | Roberts | Oct. 10, 1939 |
| 2,318,140 | Clark | May 4, 1943 |
| 2,353,979 | Weisglass | July 18, 1944 |
| 2,512,193 | Zavales | June 20, 1950 |
| 2,542,021 | Fox | Feb. 20, 1951 |
| 2,579,255 | Graves | Dec. 18, 1951 |